United States Patent
Yang

(10) Patent No.: US 11,244,473 B2
(45) Date of Patent: Feb. 8, 2022

(54) POSITIONING METHOD, POSITIONING APPARATUS OF MOBILE DEVICE AND ELECTRONIC DEVICE

(71) Applicant: Beijing Horizon Robotics Technology Research and Development Co., Ltd., Beijing (CN)

(72) Inventor: Shuai Yang, Beijing (CN)

(73) Assignee: Beijing Horizon Robotics Technology Research and Development Co., Ltd., Beijing (CN)

( * ) Notice: Subject to any disclaimer, the term of this patent is extended or adjusted under 35 U.S.C. 154(b) by 100 days.

(21) Appl. No.: 16/716,801

(22) Filed: Dec. 17, 2019

(65) Prior Publication Data

US 2020/0193636 A1 Jun. 18, 2020

(30) Foreign Application Priority Data

Dec. 18, 2018 (CN) .......................... 201811548924.X

(51) Int. Cl.
  *G06T 7/73* (2017.01)
  *G06T 7/13* (2017.01)
(52) U.S. Cl.
  CPC .................. *G06T 7/74* (2017.01); *G06T 7/13* (2017.01); *G06T 2207/10028* (2013.01)
(58) Field of Classification Search
  CPC .......... G01C 21/26; G01C 21/32; G06T 7/74; G06T 7/13; G06T 2207/10028
  See application file for complete search history.

(56) References Cited

U.S. PATENT DOCUMENTS

2014/0297093 A1 10/2014 Murai et al.
2018/0267172 A1 9/2018 Oh et al.
(Continued)

FOREIGN PATENT DOCUMENTS

CN 103150556 A 6/2013
CN 106092104 A 11/2016
(Continued)

OTHER PUBLICATIONS

Gruyer, Dominique, Rachid Belaroussi, and Marc Revilloud. "Accurate lateral positioning from map data and road marking detection." Expert Systems with Applications 43 (2016): 1-8. (Year: 2016).*
(Continued)

*Primary Examiner* — Vu Le
*Assistant Examiner* — Tracy Mangialaschi
(74) *Attorney, Agent, or Firm* — Westbridge IP LLC

(57) ABSTRACT

A positioning method of a mobile device includes: determining a first position and orientation parameter of a mobile device when a current frame image is captured, and determining a straight line corresponding to a preset sign in the current frame image; determining a plurality of second position and orientation parameters based on the first position and orientation parameter; determining, in a high-definition map, point cloud data within a preset range of a geographic location when the current frame image is captured; converting the point cloud data within the preset range into a pixel plane-coordinate system to obtain a plurality of second image coordinate sets; determining, based on distances from image coordinates in the plurality of second image coordinate sets to the straight line, a position and orientation parameter of the mobile device when the current frame image is captured among the plurality of second position and orientation parameters.

19 Claims, 7 Drawing Sheets

(56) References Cited

U.S. PATENT DOCUMENTS

2018/0328742 A1* 11/2018 Asai ................. G01C 21/14
2018/0336697 A1* 11/2018 Lu ..................... G01S 17/89

FOREIGN PATENT DOCUMENTS

| CN | 106156723 A | 11/2016 |
| CN | 106203341 A | 12/2016 |
| CN | 107131883 A | 9/2017 |
| CN | 107714082 A | 2/2018 |
| CN | 107741224 A | 2/2018 |
| CN | 108413971 A | 8/2018 |
| CN | 108571974 A | 9/2018 |
| EP | 3343173 A1 | 7/2018 |
| JP | 2016071665 A | 5/2016 |

OTHER PUBLICATIONS

Lee, Hyunsung, et al. "AVM/LiDAR sensor based lane marking detection method for automated driving on complex urban roads." 2017 IEEE Intelligent Vehicles Symposium (IV). IEEE, 2017. (Year: 2017).*

Extended European Search Report in counterpart European Patent Application No. 19216917.5, dated Apr. 30, 2020.

\* cited by examiner

POSITIONING METHOD, POSITIONING APPARATUS OF MOBILE DEVICE AND ELECTRONIC DEVICE

CROSS-REFERENCE TO RELATED APPLICATIONS

This application claims priority to Chinese Patent Application No. 201811548924.X, filed on Dec. 18, 2018, which is hereby incorporated by reference in its entirety.

TECHNICAL FIELD

The present application relates to the field of image processing technologies, in particular to a positioning method and a positioning apparatus of a mobile device, and an electronic device.

BACKGROUND

As one of the basic technologies of smart science and technologies, positioning technology is of great importance obviously. Especially in the field of autonomous driving, accuracy and rapidity of the positioning technology are important factors related to personal safety. However, the existing laser radar positioning technology is costly, in spite of its high accuracy.

SUMMARY

In order to solve the above technical problems, a positioning method and a positioning apparatus of a mobile device, and an electronic device are provided according to embodiments of the present application.

According to an aspect, an embodiment of the present application provides a positioning method of a mobile device. The positioning method of the mobile device includes: determining a first position and orientation parameter of a mobile device when a current frame image is captured, and determining a straight line corresponding to a preset sign in the current frame image; determining a plurality of second position and orientation parameters based on the first position and orientation parameter; determining, in a high-definition map, point cloud data within a preset range of a geographic location of the mobile device when the current frame image is captured; converting, based on the plurality of second position and orientation parameters, the point cloud data within the preset range into a pixel plane-coordinate system to obtain a plurality of second image coordinate sets; determining, based on distances from image coordinates in the plurality of second image coordinate sets to the straight line, a position and orientation parameter of the mobile device when the current frame image is captured among the plurality of second position and orientation parameters.

According to another aspect, an embodiment of the present application provides a positioning apparatus of a mobile device. The positioning apparatus of the mobile device includes: a first position and orientation parameter determining module, configured to determine a first position and orientation parameter of a mobile device when a current frame image is captured, and determine a straight line corresponding to a preset sign in the current frame image; a second position and orientation parameter determining module, configured to determine a plurality of second position and orientation parameters based on the first position and orientation parameter; a point cloud data determining module, configured to determine, in a high-definition map, point cloud data within a preset range of a geographic location of the mobile device when the current frame image is captured; a second image coordinate set determining module, configured to convert, based on the plurality of second position and orientation parameters, the point cloud data within the preset range into a pixel plane-coordinate system to obtain a plurality of second image coordinate sets; a position and orientation parameter determining module, configured to determine, based on distances from image coordinates in the plurality of second image coordinate sets to the straight line, a position and orientation parameter of the mobile device when the current frame image is captured among the plurality of second position and orientation parameters.

In the positioning method of the mobile device according to the embodiments of the present application, the position and orientation parameter of the mobile device when the current frame image is captured may be determined according to the distances to the straight line from the point cloud data of the high-definition map, corresponding to the preset sign, in the current frame image, thereby positioning of the mobile device is realized based on the vision camera technology. Compared with the existing positioning method by using the laser radar positioning technology, the positioning may be realized without using real-time reflection values of the laser radar in the positioning method mentioned in the embodiments of the present application. Therefore, an influence of environmental conditions, such as illumination, seasons and dynamic objects on positioning accuracy may be greatly reduced, thereby the positioning accuracy may be improved according to the positioning method mentioned in the embodiments of the present application. In addition, positioning costs may be greatly reduced by means of the vision camera in the embodiments of the present application.

BRIEF DESCRIPTION OF DRAWINGS

The above and other objects, features and advantages of the present application may become more apparent according to the more detailed description of embodiments of the present application in combination with accompanying drawings. The accompanying drawings are configured to provide a further understanding of the embodiments of the present application, and constitute a part of the specification. The accompanying drawings, together with the embodiments of the present application, are configured to explain the present application, without limiting the present application. In the accompanying drawings, the same reference numerals generally refer to the same parts or steps.

DETAILED DESCRIPTION

Figure 1:
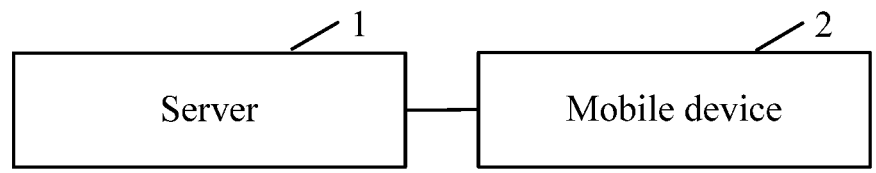
FIG. 1 shows a scene applicable to the present application.

Hereinafter, exemplary embodiments of the present application may be described in detail with reference to accompanying drawings. Obviously, the described embodiments are only a part of the embodiments of the present application, but not all of the embodiments. It may be understood that the present application is not limited by the exemplary embodiments described herein.

Application Overview

Positioning accuracy and positioning speed are important indicators for measuring performance of positioning technology. Especially for positioning technology applied to the field of autonomous driving, the positioning accuracy and the positioning speed are important factors related to personal safety.

Currently, laser radar positioning technology is usually used as the positioning technology in the field of autonomous driving. A positioning principle of the laser radar positioning technology is shown as follows. Firstly, a high-definition map is generated based on the laser radar technology, then a detection signal (laser beam) is transmitted to a target and a signal reflected by the target (target echo) is received. Information related to the target, such as target distance, orientation, altitude, speed, pose and even shape, is obtained by comparing the reflected signal with the transmitted detection signal in combination with the generated high-definition map. However, the laser radar positioning technology is extremely costly, in spite of its high positioning accuracy.

In contrast, a vision camera gets more attention due to its low price. However, since depth information may not be directly obtained by the vision camera, positioning accuracy of vision camera positioning technology is much less than the positioning accuracy of the laser radar positioning technology.

In view of the above technical problems, a basic conception of the present application is to provide a positioning method and a positioning apparatus of a mobile device, and an electronic device. In the positioning method of the mobile device according to the embodiments of the present application, by means of determining a rough position and orientation parameter of the mobile device when a current frame image is captured and a straight line corresponding to a preset sign in the current frame image, determining a plurality of hypothetical position and orientation parameters based on the rough position and orientation parameter, and then obtaining point cloud data within a preset range corresponding to a geographic location of the mobile device when the current frame image is captured in a high-definition map, converting the point cloud data within the preset range into a pixel plane-coordinate system in combination with the plurality of hypothetical position and orientation parameters to obtain a plurality of image coordinate sets, and calculating distances from the image coordinates in the plurality of image coordinate sets to the straight line to determine a position and orientation parameter of the mobile device when the current frame image is captured, positioning of the mobile device is realized based on the vision camera technology.

Compared with the existing positioning method by using the laser radar positioning technology, the positioning may be realized without using real-time reflection values of the laser radar in the positioning method mentioned in the embodiments of the present application. Therefore, an influence of environmental conditions, such as illumination, seasons and dynamic objects on positioning accuracy may be greatly reduced, thereby the positioning accuracy may be improved according to the positioning method mentioned in the embodiments of the present application. In addition, positioning costs may be greatly reduced by means of the vision camera in the embodiments of the present application.

It may be noted that an application scope of the present application is not limited to the field of autonomous driving. For example, technical solutions mentioned in the embodiments of the present application may also be applied to other smart mobile devices (such as smart robots) to provide positioning technical support for moving functions of the smart mobile devices.

After a basic principle of the present application is introduced, various non-limiting embodiments of the present application may be described below in detail with reference to the accompanying drawings.

Exemplary Systems

FIG. 1 shows a scene applicable to the present application. As shown in FIG. 1, the scene applicable to the present application refers to a positioning scene of a mobile device. The positioning scene includes a server 1 and a mobile device 2. The server 1 is configured to acquire a current frame image captured by the mobile device 2 and high-definition map data, and perform a positioning operation based on the acquired data.

Specifically, the server 1 is configured to determine a rough position and orientation parameter of the mobile device 2 when the current frame image is captured, and determine a straight line corresponding to a preset sign in the current frame image, then generate a plurality of hypothetical position and orientation parameters based on the rough position and orientation parameter, and obtain point cloud data within a preset range corresponding to a geographic location of the mobile device 2 when the current frame image is captured in the high-definition map, and convert, based on the plurality of hypothetical position and orientation parameters, the point cloud data within the preset range into a pixel plane-coordinate system to obtain a plurality of image coordinate sets, and finally determine a position and orientation parameter of the mobile device when the current frame image is captured by means of calculating distances from image coordinates in the plurality of image coordinate sets to the straight line. The mobile device 2 is configured to capture the current frame image. With this scene, calculation amount of the mobile device 2 may be reduced.

It may be noted that another scene may be applicable to the present application. Specifically, this positioning scene includes the mobile device 2. The mobile device 2 is configured to capture the current frame image and obtain the high-definition map data, and determine a rough position and orientation parameter of the mobile device 2 when the current frame image is captured, and determine a straight line corresponding to a preset sign in the current frame image, then generate a plurality of hypothetical position and orientation parameters based on the rough position and orientation parameter, and obtain point cloud data within a preset range corresponding to a geographic location of the mobile device 2 when the current frame image is captured in the high-definition map, and convert, based on the plurality of hypothetical position and orientation parameters, the point cloud data within the preset range into a pixel plane-coordinate system to obtain a plurality of image coordinate sets, and finally determine a position and orientation parameter of the mobile device when the current frame image is captured by means of calculating distances from image coordinates in the plurality of image coordinate sets to the straight line. The mobile device 2 is configured to capture the current frame image. With this scene, the mobile device 2 may be positioned in real time.

Exemplary Methods

Figure 2:
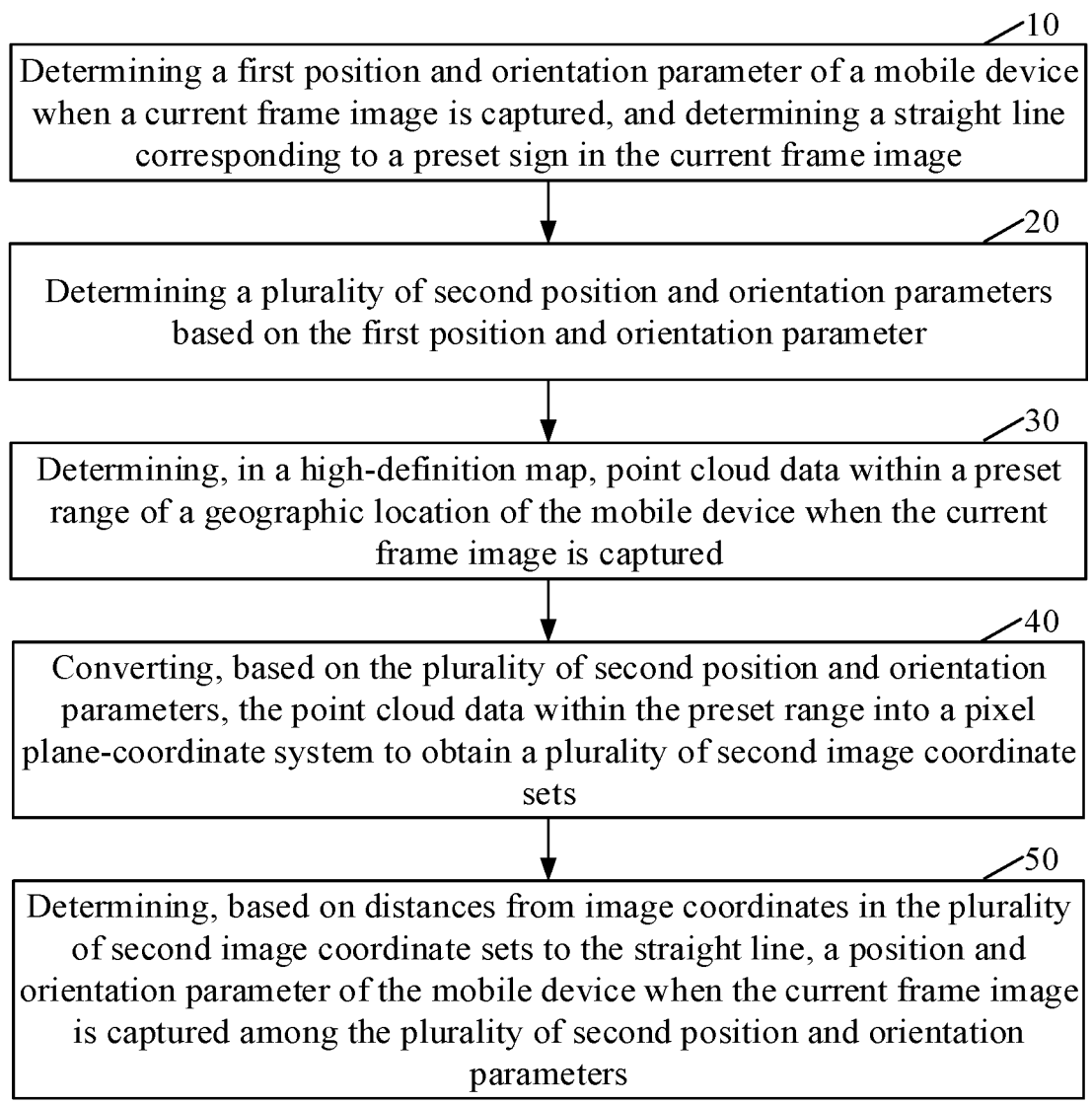
FIG. 2 shows a schematic flowchart of a positioning method of a mobile device according to an exemplary embodiment of the present application.

FIG. 2 shows a schematic flowchart of a positioning method of a mobile device according to an exemplary embodiment of the present application. The positioning method of the mobile device according to the embodiments of the present application may be applied to the field of autonomous driving of vehicles, and may also be applied to the field of moving functions of smart robots. As shown in FIG. 2, the positioning method of the mobile device according to the embodiment of the present application includes the following steps.

Step 10: determining a first position and orientation parameter of a mobile device when a current frame image is captured, and determining a straight line corresponding to a preset sign in the current frame image.

It may be noted that the first position and orientation parameter refers to a rough position and orientation parameter of the mobile device when the current frame image is captured. The position and orientation parameter includes a position parameter and an orientation parameter. The position parameter includes geographic location data of the mobile device. The orientation parameter includes azimuth angle data, pitch angle data and roll angle data of the mobile device.

It may be noted that the current frame image refers to a current frame image related to surrounding environment where the mobile device is located. For example, the mobile device refers to a vehicle, and a camera is installed in a cab of the vehicle or on an outer side of the vehicle body. When the mobile device is required to be positioned, the camera on the vehicle performs a shooting operation to capture the image (i.e., the current frame image) related to the surrounding environment where the vehicle is located. It may be understood that the vehicle itself may be or may be not included in the captured current frame image, which is not limited in the embodiments of the present application.

In addition, it may be noted that the straight line corresponding to the preset sign in the current frame image mentioned in step 10 refers to a straight line corresponding to a preset sign in the current frame image.

For example, in an embodiment of the present application, the positioning method of the mobile device is applied to the field of autonomous driving of vehicles, and the captured current frame image includes a road lane line. Then, the road lane line is set as the preset sign, and the straight line corresponding to the preset sign refers to a straight line corresponding to the road lane line, such as an edge line. As another example, the positioning method of the mobile device is applied to the field of autonomous driving of vehicles, and the captured current frame image includes a road stop line. Then, the road stop line is set as the preset sign, and the straight line corresponding to the preset sign refers to a straight line corresponding to the road stop line, such as an edge line. It may be understood that when the positioning method of the mobile device is applied to the field of autonomous driving of vehicles, the preset sign may also be other road signs, which is not limited in the embodiments of the present application.

It may be noted that the road lane line and the road stop line have good stability and are less affected by light, season, angle and so on. Therefore, by means of selecting the preset sign as the road lane line or the road stop line with relatively high stability, accuracy of subsequently calculating distances from image coordinates in a second image coordinate set to the straight line may be improved. Thereby, accuracy of the final determined position and orientation parameter of the mobile device may be improved. That is, positioning accuracy may be improved.

Step 20: determining a plurality of second position and orientation parameters based on the first position and orientation parameter.

Step 30: determining, in a high-definition map, point cloud data within a preset range of a geographic location of the mobile device when the current frame image is captured.

The high-definition map refers to a map which may assist in the completion of the positioning technology, such as a map generated based on the laser radar technology.

It may be noted that the point cloud data refers to the point cloud data within the preset range of the geographic location of the mobile device when the current frame image is captured. That is, a geographic location corresponding to the point cloud data corresponds to the geographic location of the mobile device when the current frame image is captured.

Step 40: converting, based on the plurality of second position and orientation parameters, the point cloud data within the preset range into a pixel plane-coordinate system to obtain a plurality of second image coordinate sets.

In step 40, the pixel plane-coordinate system includes information of the point cloud data, such as attribute information and grayscale information.

Step 50: determining, based on distances from image coordinates in the plurality of second image coordinate sets to the straight line, a position and orientation parameter of the mobile device when the current frame image is captured among the plurality of second position and orientation parameters.

In a process of practical application, firstly the first position and orientation parameter of the mobile device when the current frame image is captured is determined, and the straight line corresponding to the preset sign in the current frame image is determined, and the plurality of second position and orientation parameters are determined based on the first position and orientation parameter, and then in the high-definition map, the point cloud data within the preset range of the geographic location of the mobile device when the current frame image is captured is determined, and based on the plurality of second position and orientation parameters, the point cloud data within the preset range is converted into the pixel plane-coordinate system to obtain the plurality of second image coordinate sets, finally based on the distances from the image coordinates in the plurality of second image coordinate sets to the straight line, the position and orientation parameter of the mobile device when the current frame image is captured is determined among the plurality of second position and orientation parameters.

In the positioning method of the mobile device according to the embodiments of the present application, by means of determining the rough position and orientation parameter of the mobile device when the current frame image is captured and the straight line corresponding to the preset sign in the current frame image, determining the plurality of hypothetical position and orientation parameters based on the rough position and orientation parameter, and then obtaining the point cloud data within the preset range corresponding to the geographic location of the mobile device when the current frame image is captured in the high-definition map, converting the point cloud data within the preset range into the pixel plane-coordinate system in combination with the plurality of hypothetical position and orientation parameters to obtain the plurality of image coordinate sets, and calculating the distances from the image coordinates in the plurality of image coordinate sets to the straight line to determine the position and orientation parameter of the mobile device when the current frame image is captured, positioning of the mobile device is realized based on the vision camera technology.

Compared with the existing positioning method by using the laser radar positioning technology, the positioning may be realized without using real-time reflection values of the laser radar in the positioning method mentioned in the embodiments of the present application. Therefore, an influence of environmental conditions, such as illumination, seasons and dynamic objects on positioning accuracy may be greatly reduced, thereby the positioning accuracy may be improved according to the positioning method mentioned in the embodiments of the present application. In addition, positioning costs may be greatly reduced by means of the vision camera in the embodiments of the present application.

In an embodiment of the present application, the first position and orientation parameter of the mobile device is determined based on historical motion data of the mobile device. The historical motion data includes a historical position and orientation parameter and motion tendency data when the mobile device is lastly positioned successfully. Specifically, the historical position and orientation parameter includes a position parameter and an orientation parameter when the mobile device is lastly positioned successfully. The motion tendency data includes data which may represent motion tendency of the mobile device, such as speed data. It may be understood that the rough position and orientation parameter (i.e., the first position and orientation parameter) of the mobile device when the current frame image is captured may be estimated by using the historical motion data when the mobile device is lastly positioned successfully. Compared with other methods of determining the rough position and orientation parameter, the method of determining the rough position and orientation parameter (the first position and orientation parameter) by using the historical motion data of the mobile device according to the embodiment of the present application may obtain the rough position and orientation parameter with higher accuracy, which benefits improvement of the accuracy in subsequent positioning steps.

In an embodiment of the present application, based on the first position and orientation parameter, the plurality of second position and orientation parameters are determined in a manner of increasing a preset step successively. It may be noted that a specific value of the preset step may be set according to an actual situation, which is not limited in the embodiments of the present application.

For example, the first position and orientation parameter of the mobile device when the current frame image is captured is configured as a position and orientation matrix X, and the plurality of second position and orientation parameters are configured as position and orientation matrices $Y_1, Y_2, Y_3 \ldots Y_n$, respectively. Then, since the second position and orientation parameters are determined based on the first position and orientation parameter, and the position and orientation parameter includes the position parameter and the orientation parameter, a relationship between the first position and orientation parameter and each of the second position and orientation parameters may be represented by using a rotation matrix R and a translation matrix T. A specific formula is shown as follows.

$$Y_i = R_i X + T_i \qquad (1)$$

In Formula (1), i=1, 2 . . . n. A preset step of the rotation matrix is configured as a matrix $\Delta R$, and a preset step of the translation matrix is configured as $\Delta T$, then $R_i = R_{i-1} + \Delta R$, $T_i = T_{i-1} + \Delta T$. It may be understood that specific values of $\Delta R$ and $\Delta T$ may be set according to an actual situation, which is not limited in the embodiments of the present application.

That is, by using the above-mentioned formula, the plurality of second position and orientation parameters may be determined in the manner of increasing the preset step successively based on the first position and orientation parameter. That is, the plurality of hypothetical position and orientation parameters may be determined in the manner of increasing the preset step successively based on the rough position and orientation parameter.

Another embodiment of the present application is extended on the basis of the above embodiments of the present application. In another embodiment of the present application, the plurality of second position and orientation parameters are determined in a manner of decreasing a preset step successively based on the first position and orientation parameter. Differences between the embodiment of the present application and the above embodiments are mainly described below, and similarities are not described again.

Specifically, in the embodiment of the present application, based on the first position and orientation parameter, the plurality of second position and orientation parameters are determined in the manner of decreasing the preset step successively. When calculation is performed by using Formula (1) in the above embodiments, $R_i$ and $T_i$ in Formula (1) are replaced with $R_i = R_{i-1} - \Delta R$ and $T_i = T_{i-1} - \Delta T$ respectively. Similarly, it may be understood that the specific values of ΔR and ΔT may be set according to the actual situation, which is not limited in the embodiments of the present application.

That is, in a solution of determining the second position and orientation parameters mentioned in the embodiment of the present application, the plurality of second position and orientation parameters are determined in the manner of decreasing the preset step successively based on the first position and orientation parameter. That is, the plurality of hypothetical position and orientation parameters may be determined in the manner of decreasing the preset step successively based on the rough position and orientation parameter.

It may be noted that, in the solution of determining the plurality of hypothetical position and orientation parameters by increasing or decreasing the preset step successively mentioned in the above embodiments, accuracy probabilities of the hypothetical position and orientation parameters may be adequately ensured. That is to say, compared with randomly setting the hypothetical position and orientation parameters, the above embodiments of the present application may sufficiently prevent correct or approximately correct position and orientation parameters from being missed, and thus from being failed to be listed as hypothetical position and orientation parameters. Thereby a success rate of the positioning operation may be greatly improved.

Based on the solution of determining the second position and orientation parameters in the manner of increasing or decreasing the preset step successively mentioned in the above embodiments, the second position and orientation parameters may also be determined in a manner of combination of increasing the preset step successively and decreasing the preset step successively. That is, according to an actual situation, the second position and orientation parameters are determined in a manner of combination of increasing the preset step successively and decreasing the preset step successively based on the first position and orientation parameter.

For example, in the process of determining the second position and orientation parameters, a step of increasing the preset step successively and a step of decreasing the preset step successively are both included. In the step of increasing the preset step successively, the preset step of the rotation matrix is configured as a matrix $\Delta R_1$, and the preset step of the translation matrix is configured as a matrix $\Delta T_1$. In the step of decreasing the preset step successively, the preset step of the rotation matrix is configured as a matrix $\Delta R_2$, and the preset step of the translation matrix is configured as a matrix $\Delta T_2$. Therefore, in the actual process of determining the second position and orientation parameters, firstly a plurality of second position and orientation parameters are generated in the manner of increasing the preset step successively based on the first position and orientation parameter, and then a plurality of second position and orientation parameters are generated in the manner of decreasing the preset step successively based on the first position and orientation parameter.

It may be noted that, in the method of determining the plurality of hypothetical position and orientation parameters in the manner of combination of increasing the preset step successively and decreasing the preset step successively, the accuracy probabilities of the hypothetical position and orientation parameters may be further improved. For example, when the increased preset step is not equal to the decreased preset step, and the increased preset step is performed firstly, and then the decreased preset step is performed successively, prediction density may be further increased, thereby the accuracy probabilities of the hypothetical position and orientation parameters may be improved according to the embodiments of the present application. When the increased preset step and the decreased preset step are simultaneously performed, bidirectional prediction may be implemented based on the rough position and orientation parameter, thereby the accuracy probabilities of the hypothetical position and orientation parameters may be improved according to the embodiments of the present application.

Figure 3:
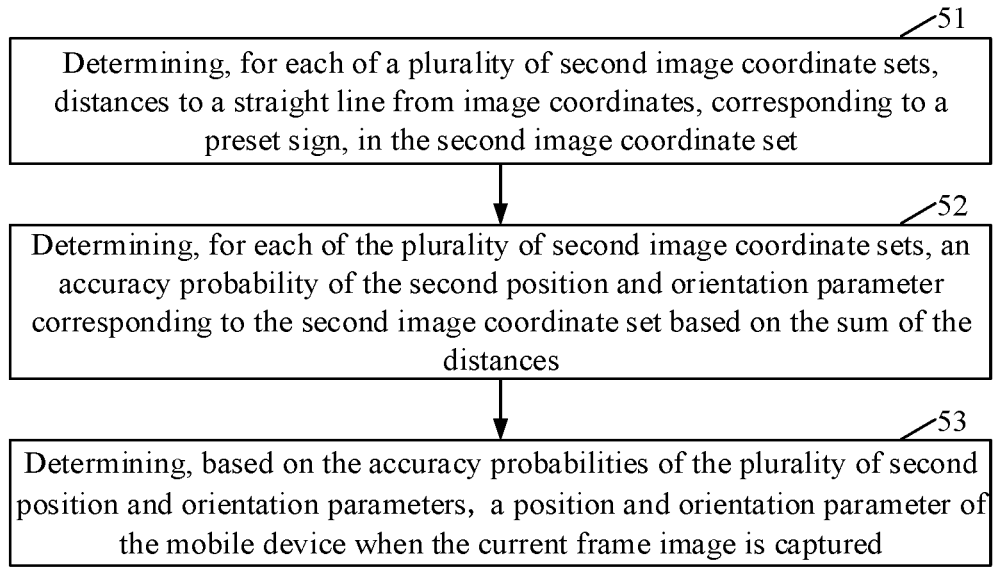
FIG. 3 shows a schematic flowchart of determining a position and orientation parameter of a mobile device when a current frame image is captured according to another exemplary embodiment of the present application.

FIG. 3 shows a schematic flowchart of determining a position and orientation parameter of a mobile device when a current frame image is captured according to another exemplary embodiment of the present application. The embodiment of the present application shown in FIG. 3 is extended on the basis of the embodiment of the present application shown in FIG. 2. Differences between the embodiment shown in FIG. 3 and the embodiment shown in FIG. 2 are mainly described below, and similarities are not described again.

As shown in FIG. 3, in the positioning method of the mobile device according to the embodiment of the present application, the determining, based on distances from image coordinates in the plurality of second image coordinate sets to the straight line, a position and orientation parameter of the mobile device when the current frame image is captured among the plurality of second position and orientation parameters (i.e., step 50) includes the following steps.

Step 51: determining, for each of a plurality of second image coordinate sets, distances to a straight line from image coordinates, corresponding to a preset sign, in the second image coordinate set.

That is, in the embodiment of the present application, a sum of the calculated distances to the straight line from the image coordinates, corresponding to the preset sign, in the second image coordinate set is used as a distance from the second image coordinate set to the straight line. It may be noted that the image coordinates corresponding to the preset sign refer to image coordinates coinciding or forming a fixed distance with the preset sign in the second image coordinate set. For example, the preset sign refers to a road stop line, and the image coordinates corresponding to the preset sign may refer to image coordinates representing the road stop line in the second image coordinate set, or may refer to image coordinates forming a fixed distance with the road stop line in the second image coordinate set, such as image coordinates corresponding to a pedestrian zebra crossing adjacent to the road stop line.

Step 52: determining, for each of the plurality of second image coordinate sets, an accuracy probability of the second position and orientation parameter corresponding to the second image coordinate set based on the sum of the distances.

Optionally, the accuracy probability of the second position and orientation parameter corresponding to the second image coordinate set is determined based on the following Formula (2).

$$P = \frac{1}{c} * \exp(-d) \tag{2}$$

In Formula (2), d represents the sum of the distances to the straight line corresponding to the preset sign from all the image coordinates, corresponding to the preset sign, in the second image coordinate set. P represents the accuracy probability of the second position and orientation parameter corresponding to the second image coordinate set. c represents a normalized parameter.

The accuracy probabilities of the plurality of second position and orientation parameters corresponding to the plurality of second image coordinate sets may be calculated according to the above step 51 and 52.

Step 53: determining, based on the accuracy probabilities of the plurality of second position and orientation parameters, a position and orientation parameter of the mobile device when the current frame image is captured.

That is to say, in a process of practical application, firstly a first position and orientation parameter of the mobile device when a current frame image is captured is determined, and the straight line corresponding to the preset sign in the current frame image is determined, and the plurality of second position and orientation parameters are determined based on the first position and orientation parameter, and then in a high-definition map, point cloud data within a preset range of a geographic location of the mobile device when the current frame image is captured is determined, and based on the plurality of second position and orientation parameters, the point cloud data within the preset range is converted into a pixel plane-coordinate system to obtain the plurality of second image coordinate sets, and then for each of the plurality of second image coordinate sets, the distances to the straight line from the image coordinates, corresponding to the preset sign, in the second image coordinate set are determined, finally the accuracy probability of the second position and orientation parameter corresponding to the second image coordinate set is determined based on the sum of the distances, and the position and orientation parameter of the mobile device when the current frame image is captured is determined based on the accuracy probabilities of the plurality of second position and orientation parameters.

In the positioning method of the mobile device mentioned in the embodiments of the present application, by means of calculating the distances to the straight line from the image coordinates, corresponding to the preset sign, in each of the second image coordinate sets, determining the accuracy probability of the second position and orientation parameter corresponding to the second image coordinate set based on the sum of the distances, and finally determining the position and orientation parameter of the mobile device when the current frame image is captured based on the accuracy probabilities of the plurality of second position and orientation parameters, the position and orientation parameter of the mobile device when the current frame image is captured is determined according to the distances to the preset sign from the image coordinates, corresponding to the preset sign, in each of the second image coordinate sets. In addition, compared with calculating distances from all the image coordinates in each of the second image coordinate sets to the straight line, the calculating the distances to the straight line from the image coordinates, corresponding to the preset sign, in each of the second image coordinate sets mentioned in the embodiments of the present application may sufficiently reduce an interference caused by image coordinates (such as trees) greatly influenced by factors such as illumination or seasons on the positioning operation. Thereby the positioning accuracy may be further improved.

Figure 4:
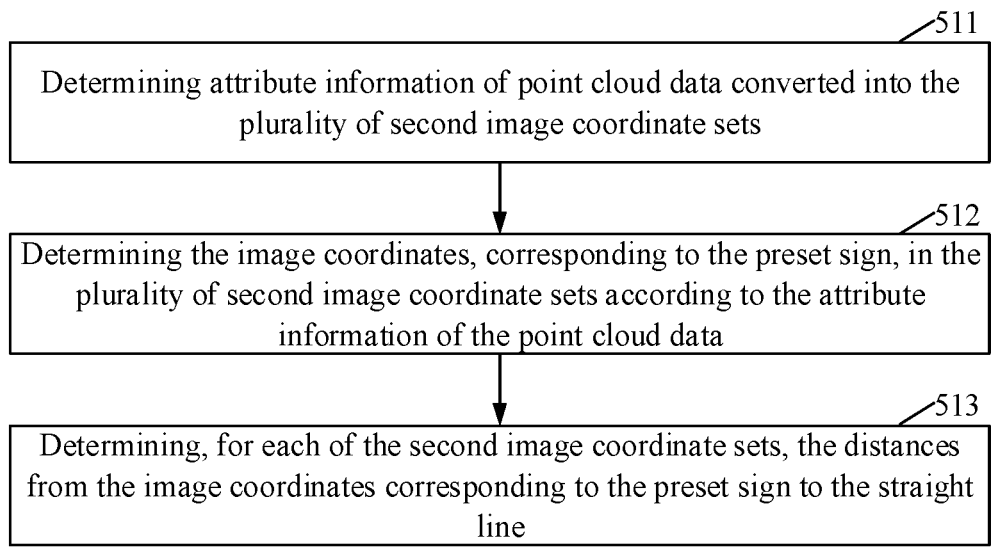
FIG. 4 shows a schematic flowchart of determining distances to a straight line from image coordinates, corresponding to a preset sign, in a second image coordinate set according to still another exemplary embodiment of the present application.

FIG. 4 shows a schematic flowchart of determining distances to a straight line from image coordinates, corresponding to a preset sign, in a second image coordinate set according to still another exemplary embodiment of the present application. The embodiment of the present application shown in FIG. 4 is extended on the basis of the embodiment of the present application shown in FIG. 3. Differences between the embodiment shown in FIG. 4 and the embodiment shown in FIG. 3. are mainly described below, and similarities are not described again.

As shown in FIG. 4, in the positioning method of the mobile device according to the embodiment of the present application, the determining, for each of a plurality of second image coordinate sets, distances to a straight line from image coordinates, corresponding to a preset sign, in the second image coordinate set (i.e., step 51) includes the following steps.

Step 511: determining attribute information of point cloud data converted into the plurality of second image coordinate sets.

It may be noted that the attribute information of the point cloud data refers to information which may represent an attribute of the point cloud data. A specific type of the attribute information is not limited in the embodiments of the present application. For example, the preset sign refers to a road lane line, the attribute information of the corresponding point cloud data in the second image coordinate sets refers to information indicating whether the point cloud data belongs to the road lane line.

Step 512: determining the image coordinates corresponding to the preset sign in the plurality of second image coordinate sets according to the attribute information of the point cloud data.

Step 513: determining, for each of the second image coordinate sets, the distances from the image coordinates corresponding to the preset sign to the straight line.

In the positioning method of the mobile device mentioned in the embodiments of the present application, by means of determining the image coordinates corresponding to the preset sign in the plurality of second image coordinate sets according to the attribute information of the point cloud data, accuracy of the determined image coordinates corresponding to the preset sign may be further improved. Thereby a precondition for improving positioning accuracy of the positioning method mentioned in the embodiments of the present application is provided.

Figure 5:
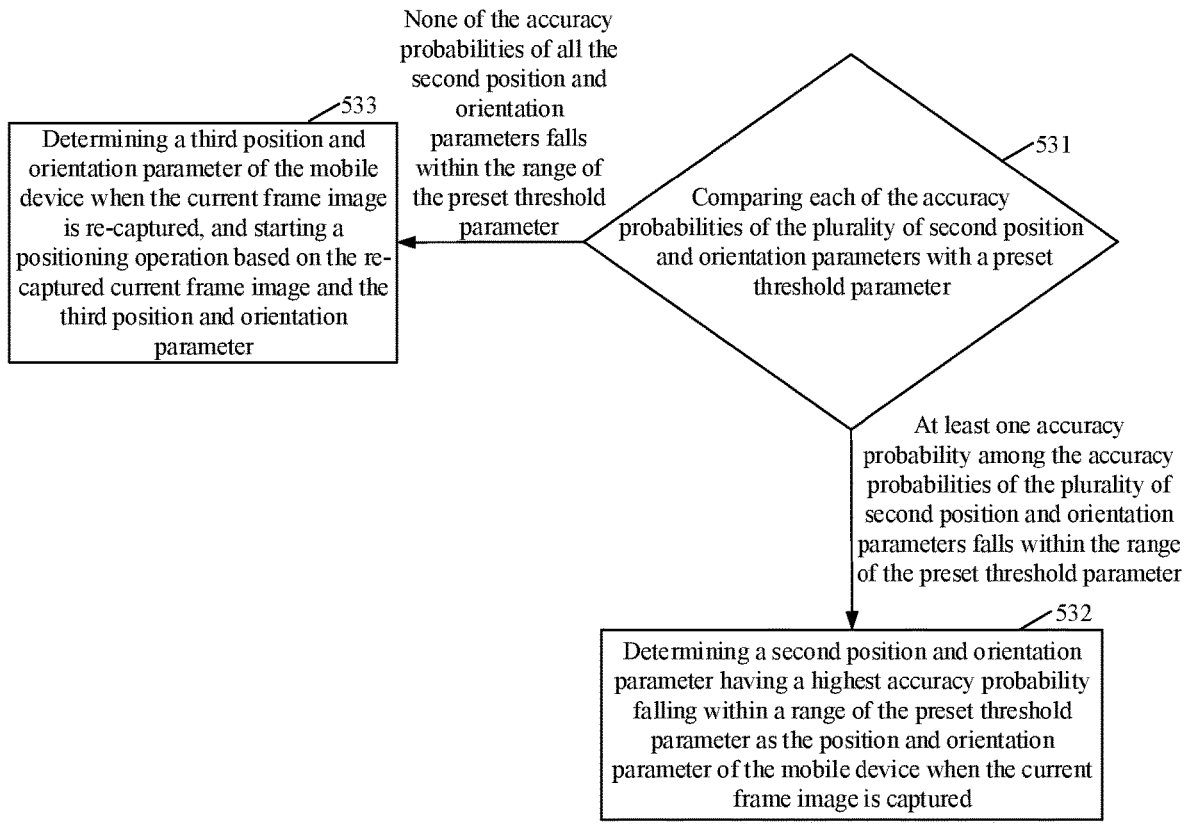
FIG. 5 shows a schematic flowchart of determining a position and orientation parameter of a mobile device when a current frame image is captured according to yet still another exemplary embodiment of the present application.

FIG. 5 shows a schematic flowchart of determining a position and orientation parameter of a mobile device when a current frame image is captured according to yet still another exemplary embodiment of the present application. The embodiment of the present application shown in FIG. 5 is extended on the basis of the embodiment of the present application shown in FIG. 3. Differences between the embodiment shown in FIG. 5 and the embodiment shown in FIG. 3 are mainly described below, and similarities are not described again.

As shown in FIG. 5, in the positioning method of the mobile device according to the embodiment of the present application, the step of determining, based on the accuracy probabilities of the plurality of second position and orientation parameters, a position and orientation parameter of the mobile device when the current frame image is captured (i.e., step 53) includes the following steps.

Step 531: comparing each of the accuracy probabilities of the plurality of second position and orientation parameters with a preset threshold parameter.

A specific value of the preset threshold parameter may be set according to an actual situation, which is not limited in the embodiments of the present application. For example, the preset threshold parameter may be [0.5,1]. That is, the preset threshold parameter includes values between 0.5 and 1. For another example, the preset threshold parameter may be [0.7,1]. That is, the preset threshold parameter includes values between 0.7 and 1.

Step 532: determining a second position and orientation parameter having a highest accuracy probability falling within a range of the preset threshold parameter as the position and orientation parameter of the mobile device when the current frame image is captured.

Step 533: determining a third position and orientation parameter of the mobile device when the current frame image is re-captured, and starting a positioning operation based on the re-captured current frame image and the third position and orientation parameter.

It may be noted that the third position and orientation parameter refers to a rough position and orientation parameter of the mobile device when the current frame image is re-captured. That is, when none of the accuracy probabilities of all the second position and orientation parameters falls within the range of the preset threshold parameter, the current frame image is re-captured, and the rough position and orientation parameter of the mobile device is re-determined, thereby the positioning operation on the mobile device may be restarted.

In a process of practical application, firstly each of the accuracy probabilities of the plurality of second position and orientation parameters is compared with the preset threshold parameter, when at least one accuracy probability among the accuracy probabilities of the plurality of second position and orientation parameters falls within the range of the preset threshold parameter, step 532 is executed, i.e., the second position and orientation parameter having the highest accuracy probability falling within the range of the preset threshold parameter is determined as the position and orientation parameter of the mobile device when the current frame image is captured, when none of the accuracy probabilities of all the second position and orientation parameters falls within the range of the preset threshold parameter, step 533 is executed, that is, the third position and orientation parameter of the mobile device when the current frame image is re-captured is determined, and the positioning operation based on the re-captured current frame image and the third position and orientation parameter is restarted.

For example, the preset threshold parameter is [0.3,1], there are 4 second position and orientation parameters, and the accuracy probability of each of the second position and orientation parameters is 0.1, 0.2, 0.3, and 0.4 successively. It may be understood that the two second position and orientation parameters with the accuracy probabilities of 0.3 and 0.4 respectively fall within the range of the preset threshold parameter. Since 0.4 is greater than 0.3, the second position and orientation parameter with the accuracy probability of 0.4 is considered as the position and orientation parameter of the mobile device when the current frame image is captured.

In the positioning method of the mobile device according to the embodiments of the present application, by means of comparing each of the accuracy probabilities of the second position and orientation parameters with the preset threshold parameter, and determining the position and orientation parameter of the mobile device when the current frame image is captured according to comparison results, the accuracy probabilities of each of the second position and orientation parameters may be filtered by using the preset threshold parameter, thereby positioning accuracy may be further improved. In addition, in the positioning method of the mobile device according to the embodiments of the present application, a situation that when none of the accuracy probabilities of all the second position and orientation parameters falls within the range of the preset threshold parameter, the second position and orientation parameter having the highest accuracy probability is forced to be selected as the position and orientation parameter of the mobile device when the current frame image is captured may be avoided, thereby the positioning accuracy may be further improved.

Figure 6:
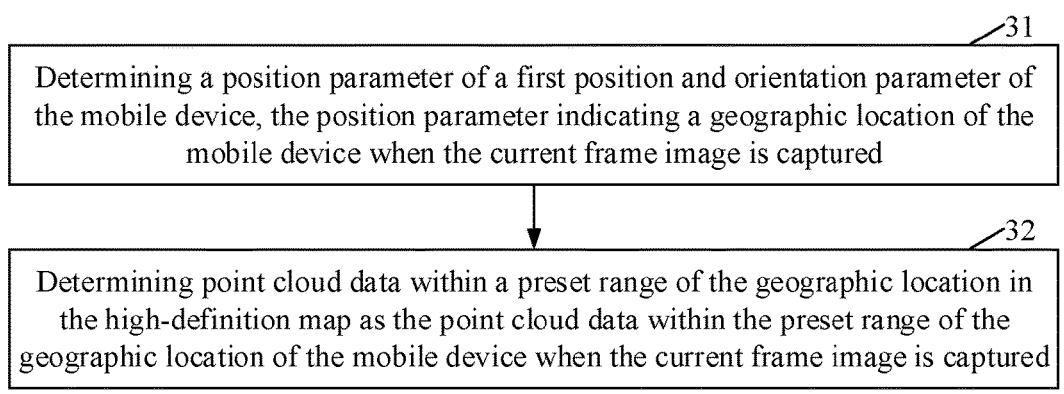
FIG. 6 shows a schematic flowchart of determining point cloud data within a preset range of a geographic location of a mobile device when a current frame image is captured according to yet still another exemplary embodiment of the present application.

FIG. 6 shows a schematic flowchart of determining point cloud data within a preset range of a geographic location of a mobile device when a current frame image is captured according to yet still another exemplary embodiment of the present application. The embodiment of the present application shown in FIG. 6 is extended on the basis of the embodiment of the present application shown in FIG. 2. Differences between the embodiment shown in FIG. 6 and the embodiment shown in FIG. 2 are mainly described below, and similarities are not described again.

As shown in FIG. 6, in the positioning method of the mobile device according to the embodiments of the present application, the determining, in a high-definition map, point cloud data within a preset range of a geographic location of the mobile device when the current frame image is captured (i.e., step 30) includes the following steps.

Step 31: determining a position parameter of a first position and orientation parameter of the mobile device, the position parameter indicating a geographic location of the mobile device when the current frame image is captured.

Step 32: determining point cloud data within a preset range of the geographic location in the high-definition map as the point cloud data within the preset range of the geographic location of the mobile device when the current frame image is captured.

It may be noted that when the high-definition map refers to a map generated based on the laser radar technology, the point cloud data includes reflection data of the laser radar. Then, the reflection data of the laser radar included in the point cloud data may be used as attribute information representing an attribute of the point cloud data.

In a process of practical application, firstly the first position and orientation parameter of the mobile device when the current frame image is captured is determined, and a straight line corresponding to a preset sign in the current frame image is determined, and a plurality of second position and orientation parameters are determined based on the first position and orientation parameter, and then the position parameter of the first position and orientation parameter of the mobile device is determined, the position parameter indicating the geographic location of the mobile device when the current frame image is captured, and the point cloud data within the preset range of the geographic location in the high-definition map is determined as the point cloud data within the preset range of the geographic location of the mobile device when the current frame image is captured, then based on the plurality of second position and orientation parameters, the point cloud data within the preset range is converted into a pixel plane-coordinate system to obtain a plurality of second image coordinate sets, finally based on distances from the image coordinates in the plurality of second image coordinate sets to the straight line, the position and orientation parameter of the mobile device when the current frame image is captured is determined among the plurality of second position and orientation parameters.

That is, in the positioning method of the mobile device according to the embodiments of the present application, by means of determining the geographic location of the mobile device when the current frame image is captured based on the position parameter of the rough position and orientation parameter of the mobile device when the current frame image is captured, and determining the point cloud data within the preset range of the geographic location in the high-definition map as the point cloud data within the preset range of the geographic location of the mobile device when the current frame image is captured, the point cloud data within the geographic location of the mobile device when the current frame image is captured may be acquired. Thereby a precondition for the subsequent steps of converting the point cloud data into the pixel plane-coordinate system to obtain the image coordinate sets, and determining the position and orientation parameter of the mobile device when the current frame image is captured based on the distances from image coordinates in the image coordinate sets to the straight line may be provided.

Exemplary Apparatuses

Figure 7:
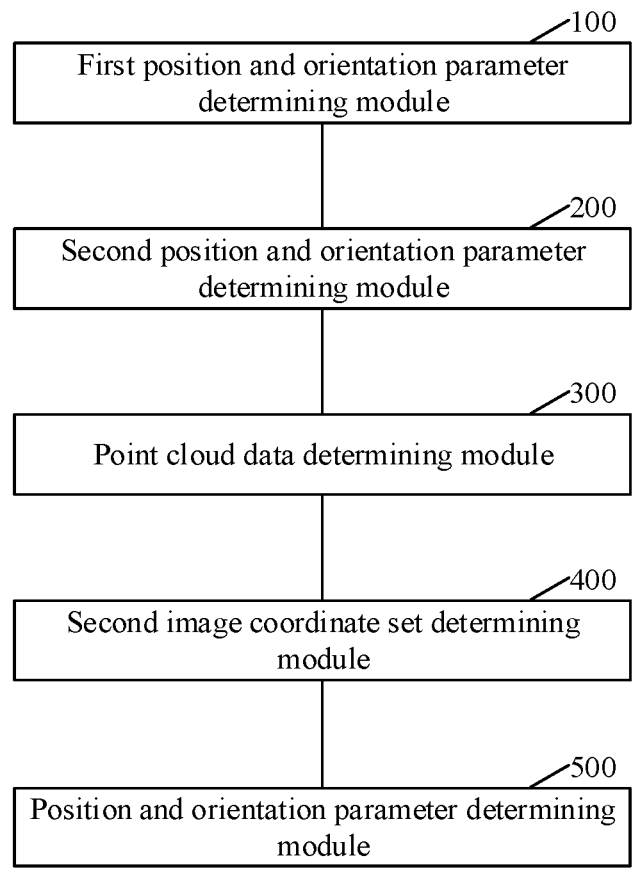
FIG. 7 shows a schematic structural diagram of a positioning apparatus of a mobile device according to an exemplary embodiment of the present application.

FIG. 7 shows a schematic structural diagram of a positioning apparatus of a mobile device according to an exemplary embodiment of the present application. The positioning apparatus of the mobile device according to the embodiment of the present application may be applied to the field of autonomous driving of vehicles, and also be applied to the field of moving functions of smart robots. As shown in FIG. 7, the positioning apparatus of the mobile device according to the embodiment of the present application includes:
  a first position and orientation parameter determining module 100, configured to determine a first position and orientation parameter of a mobile device when a current frame image is captured, and determine a straight line corresponding to a preset sign in the current frame image;
  a second position and orientation parameter determining module 200, configured to determine a plurality of second position and orientation parameters based on the first position and orientation parameter;
  a point cloud data determining module 300, configured to determine, in a high-definition map, point cloud data within a preset range of a geographic location of the mobile device when the current frame image is captured;
  a second image coordinate set determining module 400, configured to convert, based on the plurality of second position and orientation parameters, the point cloud data within the preset range into a pixel plane-coordinate system to obtain a plurality of second image coordinate sets; and
  a position and orientation parameter determining module 500, configured to determine, based on distances from image coordinates in the plurality of second image coordinate sets to the straight line, a position and orientation parameter of the mobile device when the current frame image is captured among the plurality of second position and orientation parameters.

Figure 8:
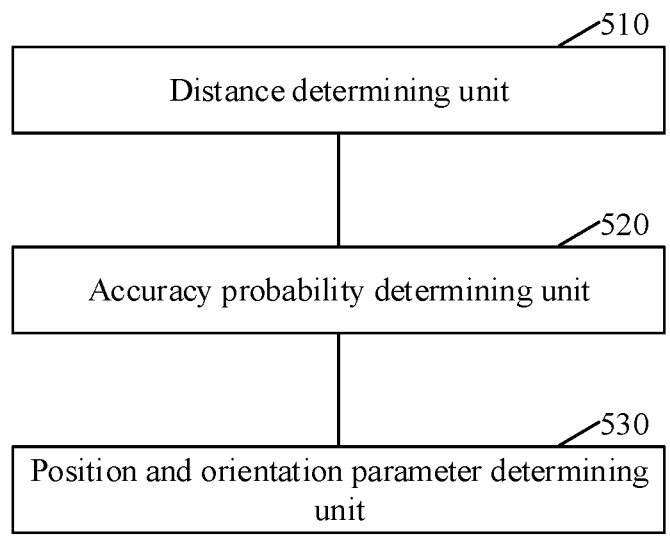
FIG. 8 shows a schematic structural diagram of a position and orientation parameter determining module of a positioning apparatus of a mobile device according to another exemplary embodiment of the present application.

FIG. 8 shows a schematic structural diagram of a position and orientation parameter determining module of a positioning apparatus of a mobile device according to another exemplary embodiment of the present application. The embodiment of the present application shown in FIG. 8 is extended on the basis of the embodiment of the present application shown in FIG. 7. Differences between the embodiment shown in FIG. 8 and the embodiment shown in FIG. 7 are mainly described below, and similarities are not described again.

As shown in FIG. 8, in the positioning apparatus of the mobile device according to the embodiment of the present application, a position and orientation parameter determining module 500 includes:
  a distance determining unit 510, configured to determine, for each of a plurality of second image coordinate sets, distances to a straight line from image coordinates, corresponding to a preset sign, in the second image coordinate set;
  an accuracy probability determining unit 520, configured to determine, for each of the plurality of second image coordinate sets, an accuracy probability of the second position and orientation parameter corresponding to the second image coordinate set based on a sum of the distances; and
  a position and orientation parameter determining unit 530, configured to determine, based on the accuracy probabilities of the plurality of second position and orientation parameters, a position and orientation parameter of the mobile device when the current frame image is captured.

Figure 9:
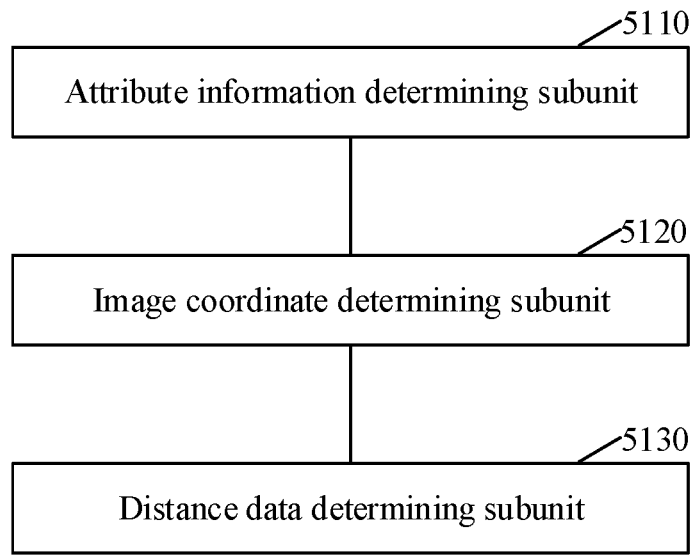
FIG. 9 shows a schematic structural diagram of a distance determining unit of a positioning apparatus of a mobile device according to still another exemplary embodiment of the present application.

FIG. 9 shows a schematic structural diagram of a distance determining unit of a positioning apparatus of a mobile device according to still another exemplary embodiment of the present application. The embodiment of the present application shown in FIG. 9 is extended on the basis of the embodiment of the present application shown in FIG. 8. Differences between the embodiment shown in FIG. 9 and the embodiment shown in FIG. 8 are mainly described below, and similarities are not described again.

As shown in FIG. 9, in the positioning apparatus of the mobile device according to the embodiment of the present application, a distance determining unit 510 includes:
  an attribute information determining subunit 5110, configured to determine attribute information of point cloud data converted into a plurality of second image coordinate sets;
  an image coordinate determining subunit 5120, configured to determine image coordinates corresponding to a preset sign in the plurality of second image coordinate sets according to the attribute information of the point cloud data; and
  a distance data determining subunit 5130, configured to determine, for each of the second image coordinate sets, distances from the image coordinates corresponding to the preset sign to the straight line.

Figure 10:
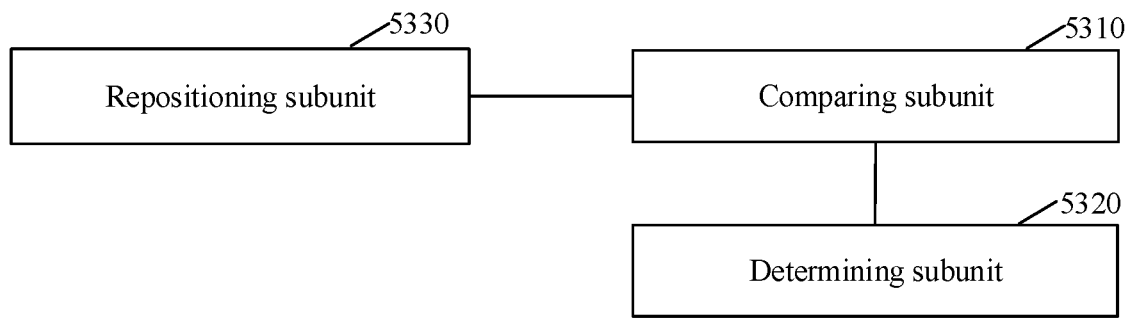
FIG. 10 shows a schematic structural diagram of a position and orientation parameter determining unit of a positioning apparatus of a mobile device according to yet still another exemplary embodiment of the present application.

FIG. 10 shows a schematic structural diagram of a position and orientation parameter determining unit of a positioning apparatus of a mobile device according to yet still another exemplary embodiment of the present application. The embodiment of the present application shown in FIG. 10 is extended on the basis of the embodiment of the present application shown in FIG. 8. Differences between the embodiment shown in FIG. 10 and the embodiment shown in FIG. 8 are mainly described below, and similarities are not described again.

As shown in FIG. 10, in the positioning apparatus of the mobile device according to the embodiment of the present application, a position and orientation parameter determining unit 530 includes:
  a comparing subunit 5310, configured to compare each of accuracy probabilities of a plurality of second position and orientation parameters with a preset threshold parameter;
  a determining subunit 5320, configured to determine a second position and orientation parameter having a highest accuracy probability falling within a range of the preset threshold parameter as a position and orientation parameter of the mobile device when the current frame image is captured, when at least one accuracy probability among the accuracy probabilities of the plurality of second position and orientation parameters falls within the range of the preset threshold parameter; and a repositioning subunit 5330, configured to determine a third position and orientation parameter of the mobile device when the current frame image is re-captured, and start a positioning operation based on the re-captured current frame image and the third position and orientation parameter, when none of the accuracy probabilities of the plurality of second position and orientation parameters falls within the range of the preset threshold parameter.

Figure 11:
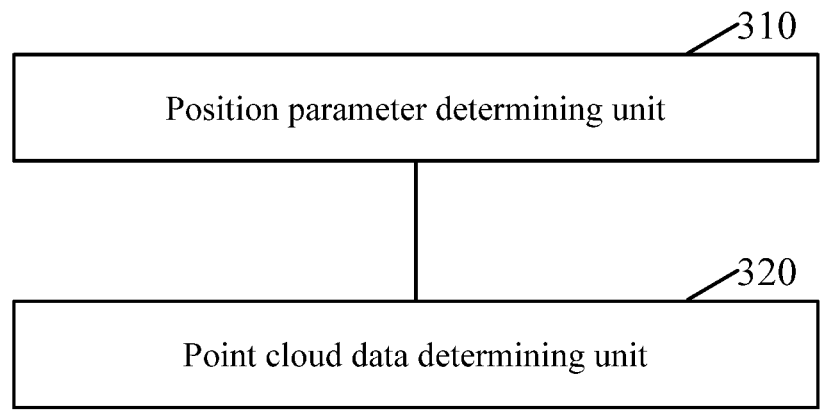
FIG. 11 shows a schematic structural diagram of a point cloud data determining module of a positioning apparatus of a mobile device according to yet still another exemplary embodiment of the present application.

FIG. 11 shows a schematic structural diagram of a point cloud data determining module of a positioning apparatus of a mobile device according to yet still another exemplary embodiment of the present application. The embodiment of the present application shown in FIG. 11 is extended on the basis of the embodiment of the present application shown in FIG. 7. Differences between the embodiment shown in FIG. 11 and the embodiment shown in FIG. 7 are mainly described below, and similarities are not described again.

As shown in FIG. 11, in the positioning apparatus of the mobile device according to the embodiment of the present application, a point cloud data determining module 300 includes:

a position parameter determining unit 310, configured to determine a position parameter of a first position and orientation parameter of the mobile device, the position parameter indicating a geographic location of the mobile device when the current frame image is captured; and a point cloud data determining unit 320, configured to determine point cloud data within a preset range of the geographic location in a high-definition map as point cloud data within a preset range of the geographic location of the mobile device when the current frame image is captured.

It may be understood that in the positioning apparatuses of the mobile device according to FIGS. 7 to 11, operations and functions of the first position and orientation parameter determining module 100, the second position and orientation parameter determining module 200, the point cloud data determining module 300, the second image coordinate set determining module 400 and the position and orientation parameter determining module 500, the position parameter determining unit 310 and the point cloud data determining unit 320 included in the point cloud data determining module 300, the distance determining unit 510, the accuracy probability determining unit 520 and the position and orientation parameter determining unit 530 included in the position and orientation parameter determining module 500, the attribute information determining subunit 5110, the image coordinate determining subunit 5120 and the distance data determining subunit 5130 included in the distance determining unit 510, and the comparing subunit 5310, the determining subunit 5320 and the repositioning subunit 5330 included in the position and orientation parameter determining unit 530 may refer to the positioning methods of the mobile device according to FIGS. 2 to 6. The operations and the functions are not to be repeated herein to avoid repetition.

Exemplary Electronic Devices

Figure 12:
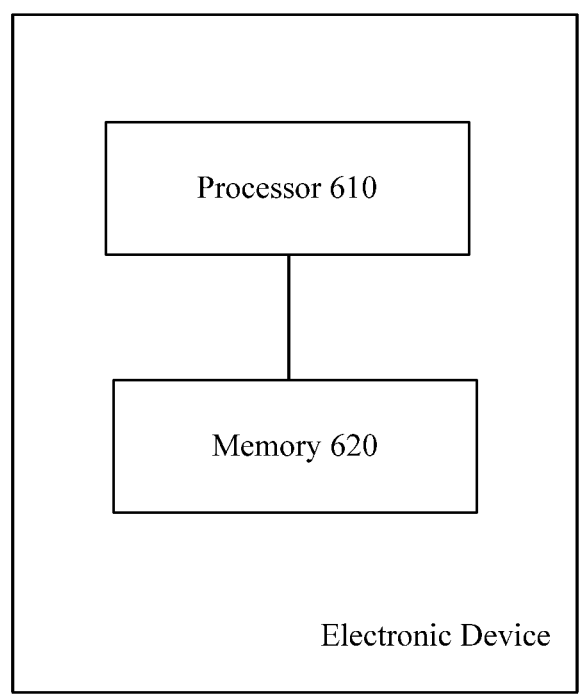
FIG. 12 shows a schematic structural diagram of an electronic device according to an exemplary embodiment of the present application.

Hereinafter, the electronic device of the positioning method of the mobile device according to embodiments of the present application will be described with reference to FIG. 12. FIG. 12 shows a schematic structural diagram of an electronic device according to an exemplary embodiment of the present application. As shown in FIG. 12, the electronic device includes one or more processors 610 and a memory 620.

The processor 610 may be a Central Processing Unit (CPU) or another form of processing unit with data processing capability and/or instruction execution capability, and may control another component in the electronic device to perform an expected function.

The memory 620 may include one or more computer program products, which may include various forms of computer-readable storage media, such as a volatile memory and/or non-volatile memory. The volatile memory may include, for example, a Random Access Memory (RAM) and/or a cache (cache). The non-volatile memory may include, for example, a Read-Only Memory (ROM), a hard disk, and a flash memory. The compute-readable storage medium may store one or more computer program instructions, and the processor 610 may run the program instructions to implement the method for the positioning method of the mobile device and/or other expected functions of the embodiments in the present application described above. The compute-readable storage medium may further store various types of content, such as a video image, a position and orientation parameter, a high-definition map, or the like.

In an example, the electronic device may further include an input apparatus and an output apparatus, and these components are interconnected by using a bus system and/or another form of connection mechanism (not shown). Here, the input apparatus may include, but not limited to, a keyboard and a mouse.

Certainly, for simplicity, only some of the components related to the present application in the electronic device are shown in FIG. 12, and components such as a bus, and an input/output interface are omitted. In addition, the electronic device may further include any other suitable component depending on a specific application case.

Exemplary Computer Program Products and Computer-Readable Storage Media

In addition to the foregoing methods and devices, an embodiment of the present application may also be a computer program product that includes computer program instructions. When the computer program instructions are run by a processor, the processor is enabled to perform the steps of the positioning method of the mobile device according to the embodiments of the present application described in the "Exemplary Methods" part of this specification.

The computer program product may write program code for performing the operations of the embodiments of the present application in any combination of one or more programming languages, and the programming languages include object-oriented programming languages such as Java and C++, and further include conventional procedural programming languages such as "C" or similar programming languages. The program code may be executed entirely on a user computing device, partly on a user device, as a stand-alone software package, partly on a user computing device while partly on a remote computing device, or entirely on a remote computing device or a server.

In addition, an embodiment of the present application may also be a computer-readable storage medium, where the computer-readable storage medium stores computer program instructions. When the computer program instructions are run by a processor, the processor is enabled to perform the steps of the positioning method of the mobile device according to the embodiments of the present application described in the "Exemplary Methods" part of this specification.

The computer-readable storage medium may use any combination of one or more readable media. The readable medium may be a readable signal medium or a readable storage medium. The readable storage medium may include, for example, but not limited to, an electronic, magnetic, optical, electromagnetic, infrared, or semiconductor system, apparatus, or means, or any combination of the above. More specific examples (a non-exhaustive list) of the readable storage medium include: an electrical connection having one or more wires, a portable computer disk, a hard disk, a Random Access Memory (RAM), a Read-Only Memory (ROM), an Erasable Programmable Read-Only Memory (EPROM or a flash memory), an optical fiber, a portable Compact Disk Read-Only Memory (CD-ROM), an optical storage means, a magnetic storage means, or any suitable combination of the above.

The foregoing describes basic principles of the present application with reference to specific embodiments. However, it may be noted that the merits, advantages, effects, and the like mentioned in the present application are merely examples but not limitations, and cannot be considered that these merits, advantages, effects, and the like are essential to the embodiments of the present application. In addition, the specific details disclosed above are intended only for the purpose of illustration and convenience of understanding, and are not limited thereto, and are not intended to limit the present application to the specific details described above.

The block diagrams of components, apparatuses, devices and systems in the present application are merely illustrative examples and are not intended to require or imply that connections, arrangements and configurations must be performed in the manner shown in the block diagrams. As will be recognized by those skilled in the art, these components, apparatuses, devices and systems can be connected, arranged and configured in any manner. Terms such as "comprise", "include", "have" are open words, meaning "include but not limited to", and they can be used interchangeably. Terms "or" and "and" used herein refer to "and/or", and they can be used interchangeably unless the context expressly indicates otherwise. Term "such as" used herein refers to "such as but not limited to" and they can be used interchangeably.

It may also be noted that, in the apparatuses, devices and methods of the present application, components or steps can be decomposed and/or recombined. These decompositions and/or recombination shall be considered as equivalent solutions of the present application.

The foregoing descriptions of the disclosed aspects are provided to enable any person skilled in the art to make or use the present application. Modifications to these aspects are very obvious to those skilled in the art and the general principles defined herein can be applied to other aspects without departing from the scope of the present application. Therefore, the present application is not intended to be limited to the aspects shown herein, but to the widest extent consistent with the principles and novel features disclosed herein.

The foregoing descriptions have been given for the purposes of illustration and description. Furthermore, this description is not intended to limit the embodiments of the present application to the form disclosed herein. Although several exemplary aspects and embodiments have been discussed above, those skilled in the art will recognize some of their variations, modifications, changes, additions, and combinations.

What is claimed is:

1. A positioning method of a mobile device, comprising:
    determining a first position and orientation parameter of a mobile device when a current frame image is captured, and determining a straight line corresponding to a preset sign in the current frame image, wherein the first position and orientation parameter refers to a rough position and orientation parameter;
    determining a plurality of second position and orientation parameters based on the first position and orientation parameter, wherein the plurality of second position and orientation parameters refer to a plurality of hypothetical position and orientation parameters;
    determining, in a high-definition map configured to assist in the completion of the positioning technology, point cloud data within a preset range of a geographic location of the mobile device when the current frame image is captured;
    converting, based on the plurality of second position and orientation parameters, the point cloud data within the preset range into a pixel coordinate system to obtain a plurality of second image coordinate sets; and
    determining, based on distances from image coordinates in the plurality of second image coordinate sets to the straight line, a position and orientation parameter of the mobile device when the current frame image is captured among the plurality of second position and orientation parameters.

2. The method of claim 1, wherein the determining a plurality of second position and orientation parameters based on the first position and orientation parameter comprises:
    determining, based on the first position and orientation parameter, the plurality of second position and orientation parameters in a manner of increasing and/or decreasing a preset step successively.

3. The method of claim 1, wherein the converting, based on the plurality of second position and orientation parameters, the point cloud data within the preset range into a pixel coordinate system to obtain a plurality of second image coordinate sets comprises:
    projecting, based on each of the plurality of second position and orientation parameters, the point cloud data within the preset range into the pixel coordinate system, so as to obtain the plurality of second image coordinate sets corresponding to the plurality of second position and orientation parameters respectively.

4. The method of claim 1, wherein the determining, based on distances from image coordinates in the plurality of second image coordinate sets to the straight line, a position and orientation parameter of the mobile device when the current frame image is captured among the plurality of second position and orientation parameters comprises:
    determining, for each of the plurality of second image coordinate sets, distances to the straight line from image coordinates, corresponding to the preset sign, in the second image coordinate set;
    determining, for each of the plurality of second image coordinate sets, an accuracy probability of the second position and orientation parameter corresponding to the second image coordinate set based on a sum of the distances; and
    determining, based on the accuracy probabilities of the plurality of second position and orientation parameters, the position and orientation parameter of the mobile device when the current frame image is captured.

5. The method of claim 4, wherein the determining, for each of the plurality of second image coordinate sets, distances to the straight line from image coordinates, corresponding to the preset sign, in the second image coordinate set comprises:
    determining attribute information of the point cloud data converted into the plurality of second image coordinate sets;
    determining the image coordinates corresponding to the preset sign in the plurality of second image coordinate sets according to the attribute information of the point cloud data; and
    determining, for each of the second image coordinate sets, the distances from the image coordinates corresponding to the preset sign to the straight line.

6. The method of claim 4, wherein the determining, based on the accuracy probabilities of the plurality of second position and orientation parameters, the position and orientation parameter of the mobile device when the current frame image is captured comprises:
    comparing each of the accuracy probabilities of the plurality of second position and orientation parameters with a preset threshold parameter; and
    when at least one accuracy probability among the accuracy probabilities of the plurality of second position and orientation parameters falls within a range of the preset threshold parameter, determining a second position and orientation parameter having a highest accuracy probability falling within the range of the preset threshold parameter as the position and orientation parameter of the mobile device when the current frame image is captured.

7. The method of claim 6, further comprising:
    when none of the accuracy probabilities of the plurality of second position and orientation parameters falls within the range of the preset threshold parameter, determining a third position and orientation parameter of the mobile device when the current frame image is re-captured, and starting a positioning operation based on the re-captured current frame image and the third position and orientation parameter.

8. The method of claim 1, wherein the determining a first position and orientation parameter of a mobile device when a current frame image is captured comprises:
    determining the first position and orientation parameter of the mobile device based on a historical position and orientation parameter or a preset position and orientation parameter of the mobile device.

9. The method of claim 1, wherein the determining, in a high-definition map, point cloud data within a preset range of a geographic location of the mobile device when the current frame image is captured comprises:
    determining a position parameter of the first position and orientation parameter of the mobile device, the position parameter indicating a geographic location of the mobile device when the current frame image is captured; and
    determining point cloud data within a preset range of the geographic location in the high-definition map as the point cloud data within the preset range of the geographic location of the mobile device when the current frame image is captured.

10. An electronic device, comprising a memory, a processor, and a computer program stored in the memory and executed by the processor, wherein when the computer program is executed by the processor, the processor implements the following steps:
    determining a first position and orientation parameter of a mobile device when a current frame image is captured, and determining a straight line corresponding to a preset sign in the current frame image, wherein the first position and orientation parameter refers to a rough position and orientation parameter;
    determining a plurality of second position and orientation parameters based on the first position and orientation parameter, wherein the plurality of second position and orientation parameters refer to a plurality of hypothetical position and orientation parameters;
    determining, in a high-definition map configured to assist in the completion of the positioning technology, point cloud data within a preset range of a geographic location of the mobile device when the current frame image is captured;
    converting, based on the plurality of second position and orientation parameters, the point cloud data within the preset range into a pixel coordinate system to obtain a plurality of second image coordinate sets; and
    determining, based on distances from image coordinates in the plurality of second image coordinate sets to the straight line, a position and orientation parameter of the mobile device when the current frame image is captured among the plurality of second position and orientation parameters.

11. The electronic device of claim 10, wherein the determining a plurality of second position and orientation parameters based on the first position and orientation parameter comprises:
    determining, based on the first position and orientation parameter, the plurality of second position and orientation parameters in a manner of increasing and/or decreasing a preset step successively.

12. The electronic device of claim 10, wherein the converting, based on the plurality of second position and orientation parameters, the point cloud data within the preset range into a pixel coordinate system to obtain a plurality of second image coordinate sets comprises:
    projecting, based on each of the plurality of second position and orientation parameters, the point cloud data within the preset range into the pixel coordinate system, so as to obtain the plurality of second image coordinate sets corresponding to the plurality of second position and orientation parameters respectively.

13. The electronic device of claim 10, wherein the determining, based on distances from image coordinates in the plurality of second image coordinate sets to the straight line, a position and orientation parameter of the mobile device when the current frame image is captured among the plurality of second position and orientation parameters comprises:
    determining, for each of the plurality of second image coordinate sets, distances to the straight line from image coordinates, corresponding to the preset sign, in the second image coordinate set;
    determining, for each of the plurality of second image coordinate sets, an accuracy probability of the second position and orientation parameter corresponding to the second image coordinate set based on a sum of the distances; and
    determining, based on the accuracy probabilities of the plurality of second position and orientation parameters, the position and orientation parameter of the mobile device when the current frame image is captured.

14. The electronic device of claim 13, wherein the determining, for each of the plurality of second image coordinate sets, distances to the straight line from image coordinates, corresponding to the preset sign, in the second image coordinate set comprises:
  determining attribute information of the point cloud data converted into the plurality of second image coordinate sets;
  determining the image coordinates corresponding to the preset sign in the plurality of second image coordinate sets according to the attribute information of the point cloud data; and
  determining, for each of the second image coordinate sets, the distances from the image coordinates corresponding to the preset sign to the straight line.

15. The electronic device of claim 13, wherein the determining, based on the accuracy probabilities of the plurality of second position and orientation parameters, the position and orientation parameter of the mobile device when the current frame image is captured comprises:
  comparing each of the accuracy probabilities of the plurality of second position and orientation parameters with a preset threshold parameter; and
  determining a second position and orientation parameter having a highest accuracy probability falling within the range of the preset threshold parameter as the position and orientation parameter of the mobile device when the current frame image is captured, when at least one accuracy probability among the accuracy probabilities of the plurality of second position and orientation parameters falls within a range of the preset threshold parameter.

16. The electronic device of claim 15, wherein the determining, based on the accuracy probabilities of the plurality of second position and orientation parameters, the position and orientation parameter of the mobile device when the current frame image is captured comprises:
  determining a third position and orientation parameter of the mobile device when the current frame image is re-captured, and starting a positioning operation based on the re-captured current frame image and the third position and orientation parameter, when none of the accuracy probabilities of the plurality of second position and orientation parameters falls within the range of the preset threshold parameter.

17. The electronic device of claim 10, wherein when the determining a first position and orientation parameter of a mobile device when a current frame image is captured comprises:
  determining the first position and orientation parameter of the mobile device based on a historical position and orientation parameter or a preset position and orientation parameter of the mobile device.

18. The electronic device of claim 10, wherein the determining, in a high-definition map, point cloud data within a preset range of a geographic location of the mobile device when the current frame image is captured comprises:
  determining a position parameter in the first position and orientation parameter of the mobile device, the position parameter indicating a geographic location of the mobile device when the current frame image is captured; and
  determining point cloud data within a preset range of the geographic location in the high-definition map as the point cloud data within the preset range of the geographic location of the mobile device when the current frame image is captured.

19. A non-transitory computer readable storage medium storing a computer program for executing the positioning method of the mobile device comprising:
  determining a first position and orientation parameter of a mobile device when a current frame image is captured, and determining a straight line corresponding to a preset sign in the current frame image, wherein the first position and orientation parameter refers to a rough position and orientation parameter;
  determining a plurality of second position and orientation parameters based on the first position and orientation parameter, wherein the plurality of second position and orientation parameters refer to a plurality of hypothetical position and orientation parameters;
  determining, in a high-definition map configured to assist in the completion of the positioning technology, point cloud data within a preset range of a geographic location of the mobile device when the current frame image is captured;
  converting, based on the plurality of second position and orientation parameters, the point cloud data within the preset range into a pixel coordinate system to obtain a plurality of second image coordinate sets; and
  determining, based on distances from image coordinates in the plurality of second image coordinate sets to the straight line, a position and orientation parameter of the mobile device when the current frame image is captured among the plurality of second position and orientation parameters.

* * * * *